US012639129B2

(12) United States Patent
Zhu et al.

(10) Patent No.: US 12,639,129 B2
(45) Date of Patent: May 26, 2026

(54) DEEP FUSION OF KERNEL EXECUTION

(71) Applicant: Microsoft Technology Licensing, LLC, Redmond, WA (US)

(72) Inventors: Haishan Zhu, Bellevue, WA (US); Preyas Janak Shah, Tampa, FL (US); Tiyasa Mitra, San Jose, CA (US); Eric S. Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 792 days.

(21) Appl. No.: 17/966,587

(22) Filed: Oct. 14, 2022

(65) Prior Publication Data

US 2024/0126617 A1 Apr. 18, 2024

(51) Int. Cl.
*G06F 9/50* (2006.01)
*G06N 20/00* (2019.01)

(52) U.S. Cl.
CPC ........... *G06F 9/5066* (2013.01); *G06N 20/00* (2019.01)

(58) Field of Classification Search
CPC ........ G06F 9/50; G06F 9/5005; G06F 9/5011; G06F 9/5016; G06F 9/5022; G06F 9/5027; G06F 9/5044; G06F 9/5066
See application file for complete search history.

(56) References Cited

U.S. PATENT DOCUMENTS

2021/0103433 A1* 4/2021 Kerr .................... G06F 9/45525

OTHER PUBLICATIONS

Gong, et al., "Graphite optimizing graph neural networks on CPUs through cooperative software-hardware techniques", Proceedings of the 2021 ACM SIGIR International Conference on Theory of Information Retrieval, ACMPUB27, USA, pp. 916-931, Jun. 18, 2022.
International Search Report and Written Opinion received for PCT Application No. PCT/US2023/031789, Dec. 21, 2023, 17 pages.
Ma, et al., "Coordinated DMA: Improving the DRAM Access Efficiency for Matrix Multiplication", IEEE Transactions on Parallel and Distributed Systems, IEEE, USA, vol. 30, No. 10, pp. 2148-2164, Mar. 25, 2019.
Niu, et al., "DNNFusion: Accelerating Deep Neural Networks Execution with Advanced Operator Fusion", arxiv.org, Cornell University Library, Jun. 20, 2021, 17 pages.
Kingma, et al., "Adam: A Method for Stochastic Optimization", In Repository of arXiv:1412.6980v1, Dec. 22, 2014, 9 Pages.
International Preliminary Report on Patentability received for PCT Application No. PCT/US23/031789, Apr. 24, 2025, 11 pages.

* cited by examiner

*Primary Examiner* — Andy Ho
(74) *Attorney, Agent, or Firm* — Holzer Patel Drennan

(57) ABSTRACT

Embodiments of the present disclosure include techniques for machine language processing. In one embodiment, the present disclosure includes configuring functional modules on a machine learning processor to execute a plurality of machine learning (ML) operations during a plurality of time segments. During the time segments, a first portion of the ML operations execute serially and at least one other ML operation executes during at least a majority of the time of each of the time segments. Serial ML operations may be processed simultaneously with the at least one other ML operation.

20 Claims, 7 Drawing Sheets

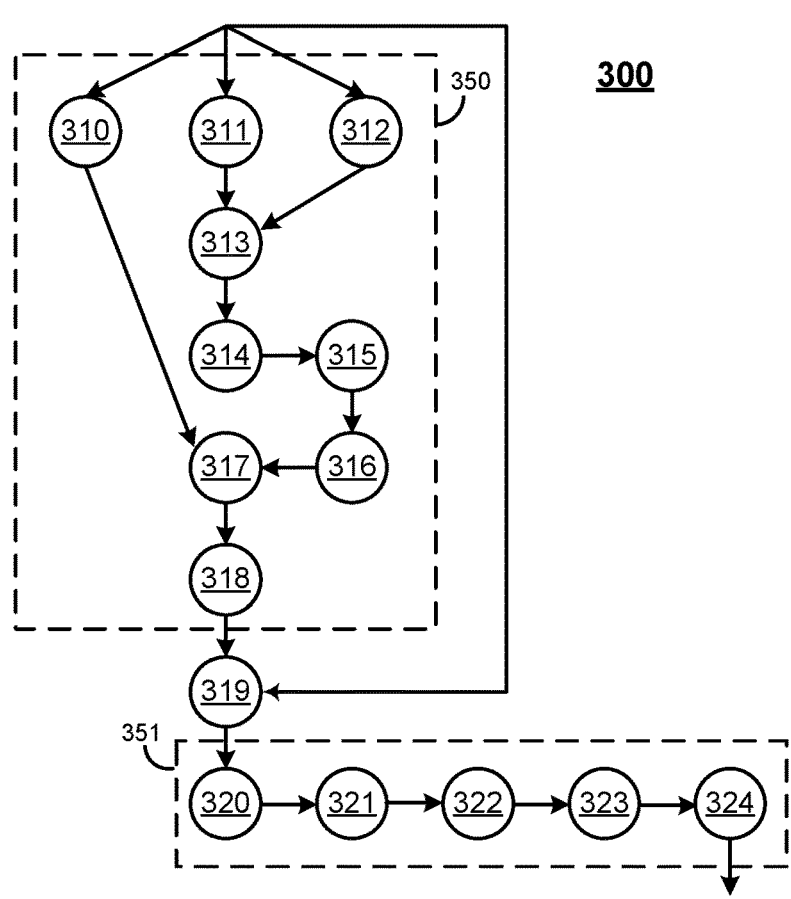

Fig. 3A

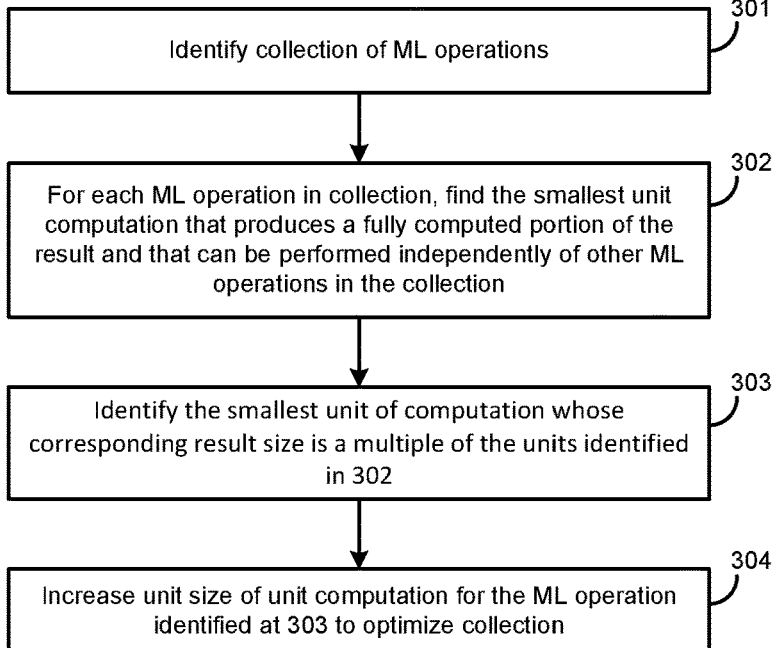

| 301 |
| :-- |
| Identify collection of ML operations |

| 302 |
| :-- |
| For each ML operation in collection, find the smallest unit computation that produces a fully computed portion of the result and that can be performed independently of other ML operations in the collection |

| 303 |
| :-- |
| Identify the smallest unit of computation whose corresponding result size is a multiple of the units identified in 302 |

| 304 |
| :-- |
| Increase unit size of unit computation for the ML operation identified at 303 to optimize collection |

DEEP FUSION OF KERNEL EXECUTION

BACKGROUND

The present disclosure relates generally to machine language processing, and in particular, to deep fusion of kernel execution.

Contemporary machine learning uses special purpose processors optimized to perform machine learning computations. One of the most common machine learning systems are systems optimized to process neural networks. Neural network workloads involve a wide range of operations, including arithmetic operations (e.g., matrix multiplications and element-wise operations), memory loads and stores (main memory to on-chip memory), data transformation (e.g., non-arithmetic/data movement operations between memory, transposing the data, data type changes), networking operations, compression/decompression, encryption/decryption, etc.

These operations have to be mapped to and performed by dedicated modules on hardware, which are typically special purpose processors designed to perform machine learning operations. Example modules on a such a processor may include dedicated modules for matrix multiplications ("Matrix Multiplication Unit"), element-wise operations ("Vector Unit"), data transformations ("Transpose Unit"), high bandwidth memory ("HBM") loads and stores, and networking operations (e.g., an "ICI Link" or "Inter-Core Interconnect Link"). These processors are sometimes referred to as "heterogeneous" hardware architectures because different processors may have different architectures optimized to perform different tasks, for example.

To achieve good performance for neural network workloads, mapping operations to hardware modules is an important factor. Traditionally, people have taken a simple approach by performing one operation at a time. Using this approach, one will perform the matrix multiplication first (e.g., load inputs from main memory, perform matrix multiplication, and store results back into main memory), and then perform the element-wise operation (e.g., load inputs from main memory, perform element-wise operation, and store the results back into main memory). This approach can lead to low performance since most of the hardware modules are left idle and only a few modules are exercised at a given time.

Kernel fusion involves the general idea of executing some of the operations together (e.g., the operations form the kernel, and multiple operations are performed at the same time). Fusing kernels may reduce memory roundtrips compared to the single operation approach above. However, conventional kernel fusion approaches are limited. For example, conventional kernel fusion may not account for all types of operations (e.g., memory loads and stores, networking, data transformation). Additionally, conventional kernel fusion may be limited to simple dependency patterns (e.g., element for element-wise operation, blocks for blocked matrix multiplication), and not able to adapt to complex dependency patterns (e.g., normalization across channels, softmax across a token). Further, prior approaches may be limited to particular hardware architectures.

The present disclosure includes kernel fusion techniques that are advantageous in many machine learning applications.

BRIEF DESCRIPTION OF THE DRAWINGS

FIG. 3A illustrates collections of operations for executing a machine learning algorithm according to an embodiment.

FIG. 3B illustrates a method of deep fusion of machine learning operations according to an embodiment.

DETAILED DESCRIPTION

Described herein are techniques for deep fusion of kernel operations. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include a general computation scheduling technique for machine learning workloads that maximize hardware resource (arithmetic unit, off-memory bandwidth, on-memory capacity, network bandwidth) utilization when executing neural network and other machine learning workloads. Certain embodiments provide an architecture agnostic approach to identify fused execution schedules in machine learning workloads, and expand conventional kernel fusion techniques to account for complex dependencies and may accommodate all main types of operations.

Figure 1:
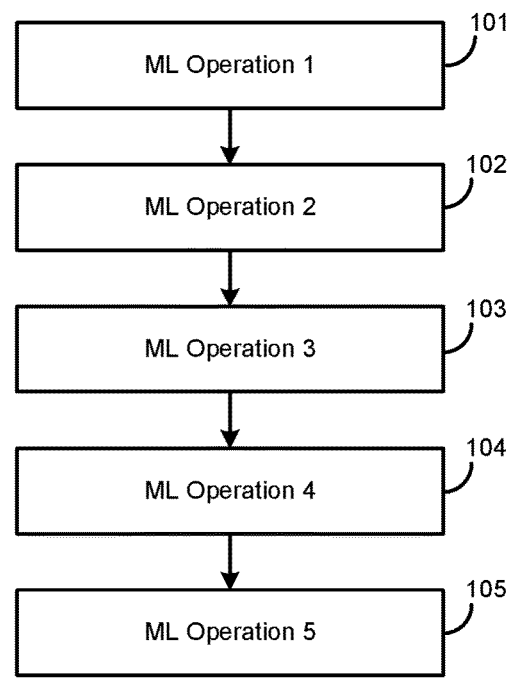
FIG. 1 illustrates a collection of machine learning operations according to an embodiment.

FIG. 1 illustrates a collection of machine learning (ML) operations 101-105 according to an embodiment. ML operations 101-105 may be a collection of ML operations performed during execution of an ML algorithm. Thus, ML operations that perform a unit of ML computation on the underlying hardware are sometimes referred to as "kernels." When executing the ML algorithm, particular ML operations may be mapped to particular hardware modules (aka hardware resources) on one or more machine learning (ML) processors. In some embodiments, the ML processors may be heterogeneous. Therefore, the ML operations in an ML processor may be mapped to particular resources during execution of an ML algorithm (e.g., by an ML compiler that transforms an ML algorithm, such as a particular neural network, into ML operations executed on one or more ML processors). ML operations according to various embodiments may include both arithmetic and non-arithmetic ML operations. For example, ML operations may include matrix multiplication (Matmul), data movement (e.g., main memory load and store), vector element operations (e.g., Softmax), data transformation (e.g., matrix transpose and quantization), and communications and collectives over networks (e.g., all reduce). Further, embodiments of the present disclosure include fused kernels comprising non-arithmetic ML operations such as data transformations, data movement operations (e.g., between on-chip memories of the same processor), data storage, networking operations, compression/decompression, and/or encryption/decryption, for example. Data transformation operations may include data type changes (e.g., INT to FLOAT) or data layout operations (e.g., matrix transpose), for example. Data storage operations may include memory load and store operations (e.g., between main memory and on-chip memory). Fusing kernels extended to include both arithmetic and non-arithmetic ML operations advantageously expands the scope of optimization to produce significant ML processor efficiency gains.

As mentioned above, some implementations have simply mapped each ML operation to a particular ML processor hardware (HW) module and executed each ML operation serially. Embodiments of the present disclosure fuse kernel operations so they can execute simultaneously on different hardware modules of ML processors. ML operations are configured on HW resources to run both serially and in parallel over multiple time segments to optimize dependencies and allow computationally time-consuming processes to be run in parallel with less time-consuming processes that may run in series, for example. Execution dependencies typically refer to certain ML operation(s) that must be completed before other ML operation(s) can begin. In certain embodiments of the disclosure, patterns of execution dependencies may advantageously execute over multiple time segments, followed by other patterns of execution dependencies. Repeating patterns of different execution dependencies may form sub-patterns, which together are repeated to form a fused kernel operation, for example. Extension of these optimizations to include arithmetic and non-arithmetic functions (e.g., networking ML operations) allows for even greater performance improvements.

Figure 2:
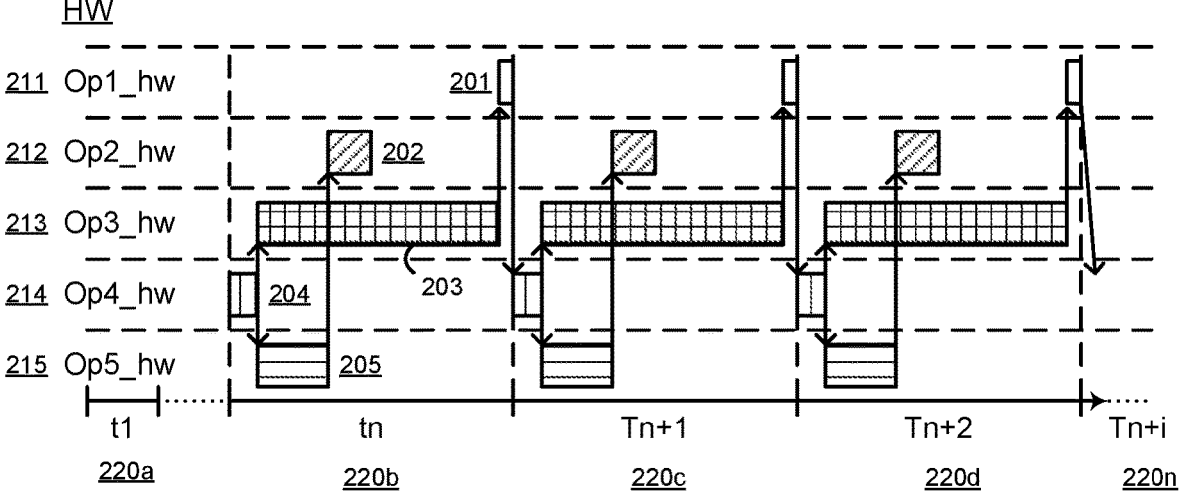
FIG. 2 illustrates a fusing machine learning operations according to an embodiment.

FIG. 2 illustrates a fusing machine learning operations according to an embodiment. In this example, functional modules (hardware, HW) 211-215 on an ML processor may be configured to execute ML operations 101-105 (illustrated in FIG. 2 as 201-205, respectively) during a plurality of time segments 220a-n. For example, Op1 101 is configured to execute on Op1_hw 211, Op2 102 is configured to execute on Op2_hw 212, Op3 103 is configured to execute on Op3_hw 213, Op4 104 is configured to execute on Op4_hw 214, and Op5 105 is configured to execute on Op5_hw 215. In this example, each ML operation is mapped to a different functional hardware module on an ML processor. However, in other embodiments, different ML operation steps may be mapped to the same ML processor functional module when such module is not already in use during a particular time segment or over different segments as illustrated below (e.g., multiple Matmul operations or network operations may be performed using the same hardware at different time points in a time segment or across multiple segments).

In this example, one or more time segments, t1 202a, may be "warm up" time segments, where certain operations (not shown) in the fused kernel are executed first to initiate parallelism and optimization over subsequent time segments. During at least a portion of each of the time segments 202b-n, a first portion of the machine learning operations (here, ML Ops 205 and 202, or Op 5-Op2) execute serially, and at least one other machine learning operation (here, ML Op 203, or Op3) executes during at least a majority of the time of each of the time segments. Machine learning operations at 205 and 202 execute simultaneously with machine learning operation at 203, thereby achieving an overall processing efficiency by reducing the amount to time required to execute ML operations 101-105, for example.

For example, Op4 204 on Op4_hw 214 may execute first. The output of Op4 may be provided to Op5 205 on Op5_hw 215 and Op3 203 on Op3_hw 213. The output of Op5 205 may be provided to Op2 202. Op3 may take a majority of the time of time segment 220b, so Op3 may be run in parallel with multiple other ML operations over each time segment (here, serials ML operations Op5 and Op2). In this example, the output of Op3 203 is stored in memory by Op3 201, which in turn is provided to Op4 204 in each subsequent time segment 220c-n until the processing of the fused kernel is completed. Accordingly, each time segment may process a portion of a total amount of data by executing the same operations in a dependency pattern as illustrated by the example in FIG. 2. The data flow and processing steps of Op1-5 101-105 are thus repeated over time segments 220c-n.

FIG. 3A illustrates collections of operations for executing a machine learning algorithm according to an embodiment. Algorithm 300 may comprise a number of ML operations 310-324. Features and advantages of the present disclosure include analyzing an ML algorithm to identify collections of ML operations that can be optimized by deep fusion as described herein. In this example, ML operations 310-318 are identified and associated with a first collection 350. Further, ML operations 320-324 are identified and associated with a second collection 351. Collection 351 may be Op1-Op5 in FIG. 1, for example. Additional examples of deeply fused collections are provided in more detail below.

Deeply fusing ML operations may proceeds as illustrated in FIG. 3B, which illustrates a method of deep fusion of machine learning operations according to an embodiment. At 301, a collection of machine learning operations to be fused from machine learning operations in a machine learning algorithm are selected. At 302, for each machine learning operation in the collection, a smallest unit computation that produces a fully computed portion of each particular machine learning operations result is determined, where the smallest unit computation is capable of being performed independently of other machine learning operations in the collection. At 303, the machine learning operation in the collection having a smallest unit computation with a result size that is a multiple of the unit sizes from 302 is identified. For example, the system may determine the smallest common denominator unit of calculation. At 304, the unit of computations of the machine learning operations identified in 303 is increased to optimize for better performance (e.g., tiling may significantly improve Matmul performance), while accounting for hardware constraints (e.g., on-chip memory size prevents pipeline granularity grow arbitrarily large). If unit computation identified in 303 is the entire operation for each of the ML operations in the collection (e.g., no fusion is possible), then an ML operation may be removed from either the front or end of the collection and the process may be repeated.

As an example, for a Matmul, followed by a normalization, followed by a network transmission, each may have a different size unit computation. The unit computation for a Matmul may be a single result from multiplying one row and one column. A normalization, however, may require an entire row of the Matmul output. A network transmission unit computation may be a single normalization result. Thus, the normalization operation may be the largest unit computation (e.g., an entire row of the Matmul output). The number of rows may be increased to optimize matrix multiplication network transmission efficiency, while subject to on-chip memory capacity constraints. Accordingly, the Matmul, normalization, and network transmission may be fused and divided across multiple time segments according to computational dependency. For example, after N rows have been identified as the granularity to perform the pipelining, the entire data set may be divided into units of N rows, and the operations may be pipelined over time segments accordingly.

Figure 4A:
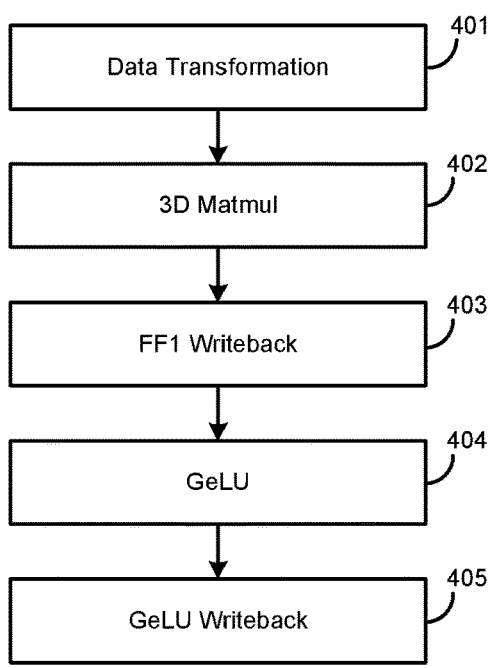
FIG. 4A illustrates an example collection of machine learning operations according to an embodiment.
Figure 4B:
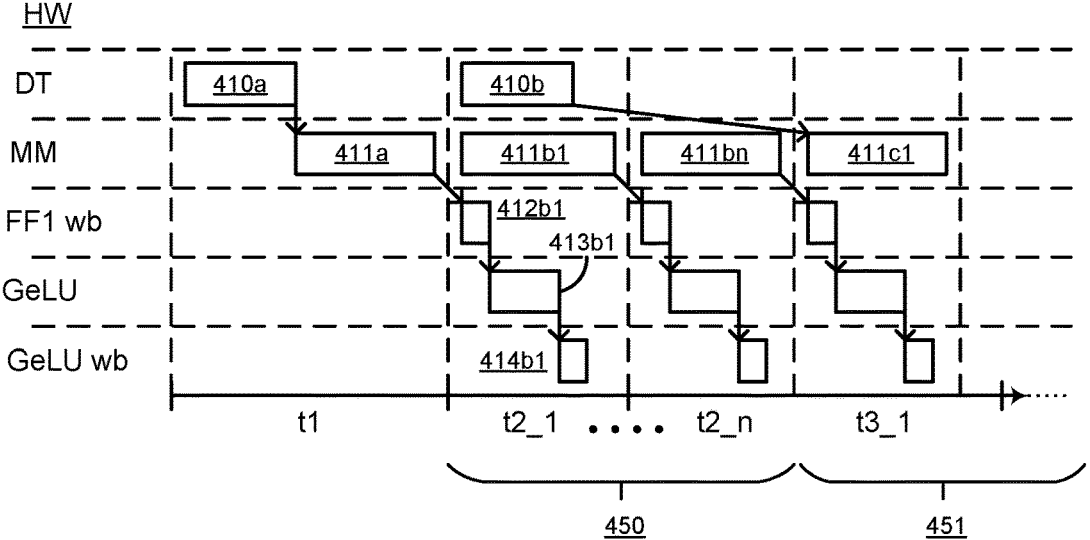
FIG. 4B illustrates an example of fusing the operations in FIG. 4A according to an embodiment.

FIG. 4A illustrates an example collection of machine learning operations according to an embodiment. In this example, the collection of ML operations comprises a data transformation 401, 3D Matmul 402, a feedforward (FF1) writeback 403, a Gaussian error Linear Unit (GeLU) 404, and a GeLU writeback 405. FIG. 4B illustrates an example of fusing the operations in FIG. 4A according to an embodiment. The collection of ML operations are fused and mapped to an ML processor's hardware modules. In this example, the hardware (HW) comprises a data transformation circuit DT, Matmul circuit MM, direct memory access DMA for FF1 writeback (FF1_wb) to memory, a vector processor configured for a GeLU operation, and DMA for the GeLU_wb.

During a warm-up time segment, t1, a first portion of the data transformation circuit is executed at 410a. The output of the data transformation circuit is provided to the Matmul hardware, which is executed at 411a. Matmul 411a produces units of partial results, allowing additional Matmul processing 411b1-bn to occur during a majority of each time segment simultaneously with serial processing of FF1 writeback 412b1, GeLU 413b1, and GeLU writeback 414b1. Matmul produces units of partial results across a plurality of time segments t2_1 to t2_n allowing FF1 writeback, GeLU, and GeLU writeback to work serially in parallel with the continued Matmul processing. Time segments t2_1 to t2_n form a first pipeline stage illustrated at 450. At some point during the first pipeline stage, data transformation operation 410b outputs additional units of partial results for Matmul 411c1 to use on one or more subsequent pipeline stages 451 that operate similarly.

Figure 5A:
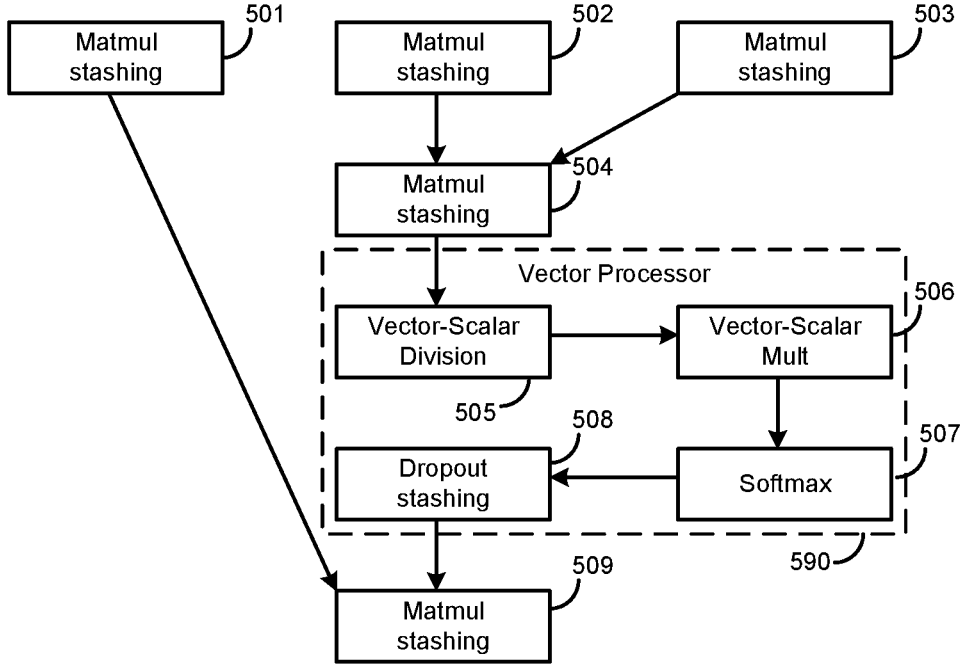
FIG. 5A illustrates another example collection of machine learning operations according to an embodiment.
Figure 5B:
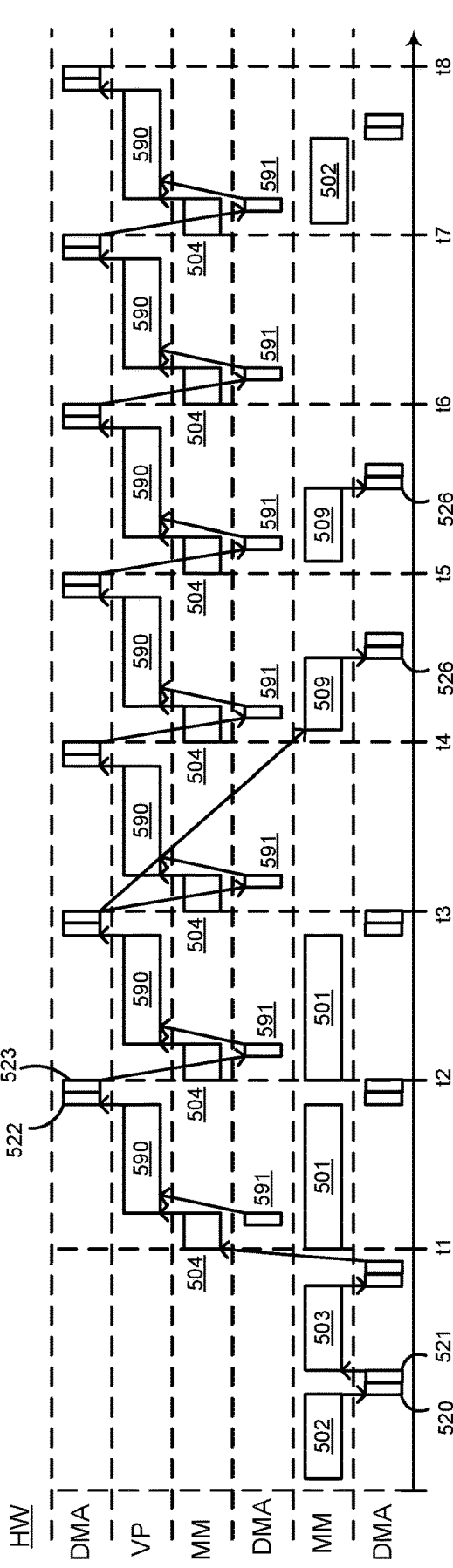
FIG. 5B illustrates an example of fusing the operations in FIG. 5A according to an embodiment.

FIG. 5A illustrates another example collection of machine learning operations according to an embodiment. In this example, the collection of ML operations comprises a three Matmuls 501-503, each with a stashing operation, or "stash" (e.g., loading units of partial results into memory). The outputs of Matmuls 502 and 503 are combined in a Matmul 504, followed by element-wise operations comprising a vector-scalar division 505, vector-scalar multiplication 506, Softmax 507, and dropout stash 508. These operations may be performed serially in a single vector processor 590 (e.g., a same instruction multiple data, SIMD, processor), for example. The output of the vector processor 590 is stored in memory (stashed) and a Matmul 509 loads units of partial results of Matmul 501 and the vector processor units of results from memory, performs the Matmul 509, and stashes the result. FIG. 5B illustrates an example of fusing the operations in FIG. 5A according to an embodiment. The collection of ML operations are fused and mapped to an ML processor's hardware modules. In this example, the hardware (HW) comprises a direct memory access DMA for vector processor read/write, two Matmul circuits MM, a direct memory access DMA for FF1 writeback (FF1_wb) to memory, a vector processor (VP) configured for a GeLU operation, and DMA for a GeLU read.

During a warm-up time segment, t1, a first portion of Matmuls 502 and 503 are executed. The units of partial results of the Matmuls 502 and 503 are stored in memory (stashed) at 520. Matmul data to be processes is loaded from memory at 521. Matmul 502-503 produce partial results, allowing Matmul processing 504 and ML operations 505-

508 in VP 590 to occur serially simultaneously with additional processing for Matmul 501 over multiple time segments t2-t3 as shown. In this example, the output of Matmul 504 and a mask at 591 are loaded into VP 590, and the output result (e.g., of Softmax) is stashed at 522. A new mask may be loaded from one memory at 523 into a new memory at 591 and loaded into VP 590 during time segment t3, for example. In this example, VP processing takes place during a majority of time of each time segment, and the collection of ML operations are optimized for keeping VP processing steps 590 going as much as possible. After time segment t4, Matmul 509 loads units of partial results from VP 590 and Matmul 501 and stores the results at 524 over time segments t5-t6. VP 590 continues to process data through time segment t7, when Matmul 502 starts another portion of data, and the pipelined process repeats.

Figure 6:
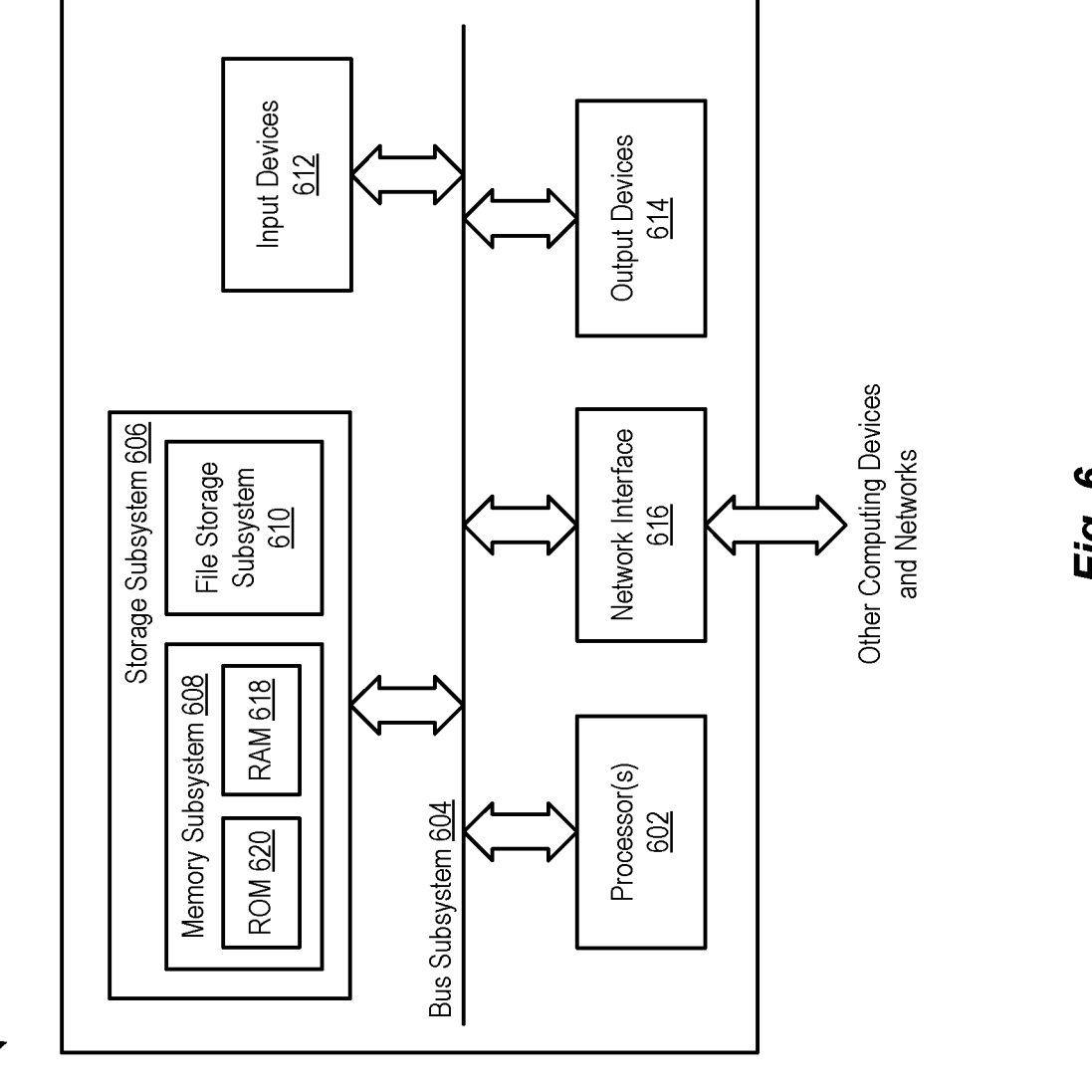
FIG. 6 depicts a simplified block diagram of an example system according to some embodiments.

FIG. 6 depicts a simplified block diagram of an example system 600, which can be used to implement some of the techniques described in the foregoing disclosure. As shown in FIG. 6, system 600 includes one or more processors 602 that communicate with a number of devices via one or more bus subsystems 604. These devices may include a storage subsystem 606 (e.g., comprising a memory subsystem 608 and a file storage subsystem 610) and a network interface subsystem 616. Some systems may further include user interface input devices 612 and/or user interface output devices 614.

Processors 602 may be optimized for machine learning or coupled to processors optimized for machine learning, for example, to configure such processors with fused kernels as described herein. Machine learning processors may comprise subsystems for carrying out machine learning (ML) operations, such as neural network operations, and executing commands to control the processing of ML data, for example. ML processors may comprise various subsystems, such as vector processors, matrix multiplication units, control state machines, and one or more on-chip memories for storing input and output data, for example. In some embodiments, ML processors are an array of processors coupled together over multiple busses for example for processing machine learning data in parallel, for example.

Bus subsystem 604 can provide a mechanism for letting the various components and subsystems of system 600 communicate with each other as intended. Although bus subsystem 604 is shown schematically as a single bus, alternative embodiments of the bus subsystem can utilize multiple busses.

Network interface subsystem 616 can serve as an interface for communicating data between system 600 and other computer systems or networks. Embodiments of network interface subsystem 616 can include, e.g., Ethernet, a Wi-Fi and/or cellular adapter, a modem (telephone, satellite, cable, etc.), and/or the like.

Storage subsystem 606 includes a memory subsystem 608 and a file/disk storage subsystem 610. Subsystems 608 and 610 as well as other memories described herein are examples of non-transitory computer-readable storage media that can store executable program code and/or data that provide the functionality of embodiments of the present disclosure.

Memory subsystem 608 comprise one or more memories including a main random access memory (RAM) 618 for storage of instructions and data during program execution and a read-only memory (ROM) 620 in which fixed instructions are stored. File storage subsystem 610 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 600 is illustrative and many other configurations having more or fewer components than system 600 are possible.

Figure 7:
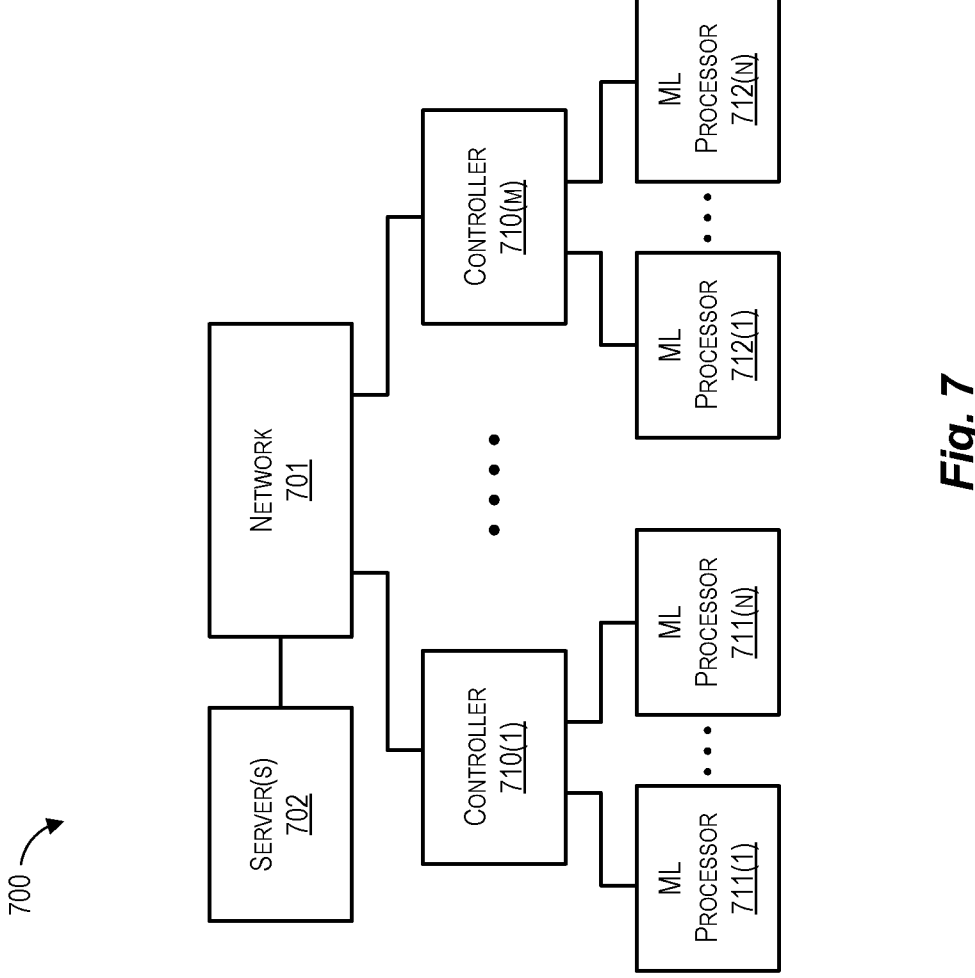
FIG. 7 illustrates a machine learning processing system according to some embodiments.

FIG. 7 illustrates a machine learning processing system according to some embodiments. In various embodiments, machine learning algorithms with fused kernels according to the present disclosure may be implemented in a hardware environment comprising one or more ML processors. A ML processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 702, which may comprise architectures illustrated in FIG. 6 above, may be coupled to a plurality of controllers 710(1)-710(M) over a communication network 701 (e.g., switches, routers, etc.). Controllers 710(1)-710(M) may also comprise architectures illustrated in FIG. 6 above. Each controller 710(1)-710(M) may be coupled to one or more ML processors, such as processors 711(1)-711(N) and 712(1)-712(N), for example. ML processors 711(1)-711(N) and 712(1)-712(N) may include a variety of configurations of functional processing blocks and memory optimized for neural network processing, such as training or inference. ML processors in FIG. 7 may include functional modules described herein (e.g., Matmul, quantization, Softmax, DMA, etc. . . . ). The ML processors may be optimized for neural network computations. Server 702 may configure controllers 710 with neural network models as well as input data to the models, which may be loaded and executed by ML processors 711(1)-711(N) and 712(1)-712 (N) in parallel, for example. Models may be translated into operational workflows, including fused kernels, as described above, for example. ML processors may load the models and apply the inputs to produce output results. ML processors may also implement training algorithms, for example. Digital circuits configured using the techniques described herein may be used in both training and inference, for example.

FURTHER EXAMPLES

Each of the following non-limiting features in the following examples may stand on its own or may be combined in various permutations or combinations with one or more of the other features in the examples below.

In various embodiments, the present disclosure may be implemented as a system (e.g., an electronic computation system), method (e.g., carried out on one or more systems), or a non-transitory computer-readable medium (CRM) storing a program executable by one or more processors, the program comprising sets of instructions for performing certain processes described above or hereinafter.

For example, in some embodiments the present disclosure includes a system, method, or CRM for machine learning comprising: a processor; and a non-transitory computer-readable medium storing a program executable by the one or more processors, the program comprising sets of instructions for: configuring a plurality of functional modules on a machine learning processor to execute a plurality of machine learning operations during a plurality of time segments, wherein, during at least a portion of each of the plurality of time segments: a first portion of the machine learning operations execute serially; and at least one of the machine learning operations executes during at least a majority of the time of each of the time segments; and one or more of the first portion of machine learning operations execute simultaneously with the at least one of the machine learning operations.

In one embodiment, the first portion of the machine learning operations comprises one or more arithmetic machine learning operations and one or more non-arithmetic machine learning operations.

In one embodiment, the first portion of the machine learning operations comprises at least one data movement operation.

In one embodiment, the first portion of the machine learning operations comprises at least one networking operation.

In one embodiment, the first portion of the machine learning operations comprises at least one memory load or memory store operation.

In one embodiment, the first portion of the machine learning operations comprises at least one compression or decompression operation.

In one embodiment, the first portion of the machine learning operations comprises at least one encryption or decryption operation.

In one embodiment, the techniques further comprising mapping the machine learning operations to one or more functional hardware modules on the machine learning processor.

In one embodiment, the techniques further comprising (i) selecting a collection of machine learning operations to be fused from machine learning operations in a machine learning algorithm; (ii) for each machine learning operation in the collection, determining a smallest unit computation that produces a fully computed portion of each particular machine learning operations result, wherein the smallest unit computation is capable of being performed independently of other machine learning operations in the collection; (iii) identifying the machine learning operation in the collection having a smallest unit computation with a corresponding result size being a multiple of each of the smallest units of computation in (ii); and (iv) increasing a number of unit computations of the machine learning operation identified in (iii).

In one embodiment, the techniques further comprising dividing one or more of the unit computations for the machine learning operations in the collection across the plurality of time segments.

In one embodiment, the techniques further comprising determining a first machine learning operation unit computation having a longest execution time, wherein the first machine learning operation is divided across the plurality of time segments as said at least one of the machine learning operations that executes during at least a majority of the time of each of the time segments.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A system for machine learning comprising:

one or more processors; and a non-transitory computer-readable medium storing a program executable by the one or more processors, the program comprising sets of instructions for:

configuring a plurality of functional modules on a machine learning processor to execute a plurality of machine learning operations during a plurality of time segments, wherein, during at least a portion of each of the plurality of time segments:

a first portion of the machine learning operations execute serially; and at least one of the machine learning operations executes during at least a majority of the time of each of the time segments; and one or more of the first portion of machine learning operations execute simultaneously with the at least one of the machine learning operations.

2. The system of claim 1, wherein the first portion of the machine learning operations comprises one or more arithmetic machine learning operations and one or more non-arithmetic machine learning operations.

3. The system of claim 1, wherein the first portion of the machine learning operations comprises at least one data movement operation.

4. The system of claim 1, wherein the first portion of the machine learning operations comprises at least one networking operation.

5. The system of claim 1, wherein the first portion of the machine learning operations comprises at least one memory load or memory store operation.

6. The system of claim 1, wherein the first portion of the machine learning operations comprises at least one compression or decompression operation.

7. The system of claim 1, wherein the first portion of the machine learning operations comprises at least one encryption or decryption operation.

8. The system of claim 1, the program further comprising sets of instructions for mapping the machine learning operations to one or more functional hardware modules on the machine learning processor.

9. The system of claim 1, the program further comprising sets of instructions for:

(i) selecting a collection of machine learning operations to be fused from machine learning operations in a machine learning algorithm;

(ii) for each machine learning operation in the collection, determining a smallest unit computation that produces a fully computed portion of each particular machine learning operations result, wherein the smallest unit computation is capable of being performed independently of other machine learning operations in the collection;

(iii) identifying the machine learning operation in the collection having a smallest unit computation with a corresponding result size being a multiple of each of the smallest units of computation in (ii); and (iv) increasing a number of unit computations of the machine learning operation identified in (iii).

10. The system of claim 9, the program further comprising sets of instructions for dividing one or more of the unit computations for the machine learning operations in the collection across the plurality of time segments.

11. The system of claim 9, the program further comprising sets of instructions for determining a first machine learning operation unit computation having a longest execution time, wherein the first machine learning operation is divided across the plurality of time segments as said at least one of the machine learning operations that executes during at least a majority of the time of each of the time segments.

12. A method of processing multi-dimensional machine learning data comprising:

configuring a plurality of functional modules on a machine learning processor to execute a plurality of machine learning operations during a plurality of time segments, wherein, during at least a portion of each of the plurality of time segments:

a first portion of the machine learning operations execute serially; and at least one of the machine learning operations executes during at least a majority of the time of each of the time segments; and one or more of the first portion of machine learning operations execute simultaneously with the at least one of the machine learning operations.

13. The method of claim 12, wherein the first portion of the machine learning operations comprises one or more arithmetic machine learning operations and one or more non-arithmetic machine learning operations.

14. The method of claim 12, wherein the first portion of the machine learning operations comprises at least one data movement operation.

15. The method of claim 12, wherein the first portion of the machine learning operations comprises at least one networking operation.

16. The method of claim 12, wherein the first portion of the machine learning operations comprises at least one memory load or memory store operation.

17. The method of claim 12, wherein the first portion of the machine learning operations comprises at least one compression or decompression operation.

18. The method of claim 12, wherein the first portion of the machine learning operations comprises at least one encryption or decryption operation.

19. A non-transitory computer-readable medium storing a program executable by one or more processors, the program comprising sets of instructions for:

configuring a plurality of functional modules on a machine learning processor to execute a plurality of machine learning operations during a plurality of time segments, wherein, during at least a portion of each of the plurality of time segments:

a first portion of the machine learning operations execute serially; and at least one of the machine learning operations executes during at least a majority of the time of each of the time segments; and one or more of the first portion of machine learning operations execute simultaneously with the at least one of the machine learning operations.

20. The non-transitory computer-readable medium of claim 19, wherein the first portion of the machine learning operations comprises one or more arithmetic machine learning operations and one or more non-arithmetic machine learning operations.

* * * * *